United States Patent [19]

Russell

[11] Patent Number: 4,667,414

[45] Date of Patent: May 26, 1987

[54] DIRECTION-FINDING DEVICES

[76] Inventor: Michael K. Russell, Lynworth House, 54 High Street, Prestbury, Cheltenham, England

[21] Appl. No.: 769,071

[22] Filed: Aug. 26, 1985

[30] Foreign Application Priority Data

Sep. 22, 1984 [GB] United Kingdom ............... 8424053

[51] Int. Cl.$^4$ ........................................... G01C 17/08
[52] U.S. Cl. ........................................ 33/364; 33/327; 33/355 R
[58] Field of Search ............. 33/364, 327, 346, 355 R

[56] References Cited

U.S. PATENT DOCUMENTS

| | | | |
|---|---|---|---|
| 2,437,132 | 3/1948 | Sinks | 33/363 Q |
| 2,755,562 | 7/1956 | Hurlburt | 33/363 Q |
| 3,084,443 | 4/1963 | Kaatz et al. | 33/364 X |
| 3,262,080 | 7/1966 | Hubbard | 33/363 N X |
| 3,286,358 | 11/1966 | Smokowski | 33/364 |
| 4,441,375 | 4/1984 | Minohara et al. | 33/327 X |

*Primary Examiner*—Harry N. Haroian
*Attorney, Agent, or Firm*—Young & Thompson

[57] ABSTRACT

A housing defines a chamber having a spherical inside surface, and a spherical float is supported within the chamber by a liquid so that the outside surface of the float is equidistantly spaced from the top and bottom of the inside surface of the chamber. The float incorporates a permanent magnet defining diametrically-opposed opposite poles which serve to orient the float with respect to the earth's magnetic field. The liquid is magnetizable, and the float is laterally centered within the chamber by magnetic interaction between the magnet poles and the magnetizable liquid. A differential fluxgate sensing head serves to sense the relative orientation of the housing and the float in a horizontal plane and to supply an electrical output signal indicative of that orientation. A highly accurate direction-finding device is thereby produced at modest cost.

14 Claims, 4 Drawing Figures

DIRECTION-FINDING DEVICES

This invention relates to direction-finding devices, and more particularly, but not exclusively, is concerned with marine heading reference systems.

Many marine navigational systems require an input indicative of the magnetic heading of the vessel. Examples of such systems are autopilots, satellite navigators and some radars. Conventionally this magnetic heading has been supplied by one of two general categories of device. The first category includes devices in the form of a conventional compass to which fluxgates have been added in order to provide an electrical output indicative of the orientation of the compass needle, and the second category includes devices using pendulous gimballed fluxgates to measure the horizontal components of the earth's magnetic field. Devices of both these categories suffer from inherent disadvantages, and any attempt to compensate for these disadvantages results in considerably increased complexity and therefore cost. The first category of device suffers from the disadvantage that a pivot system is required for the compass needle in order to compensate for roll and yaw of the vessel, and such a pivot system must be extremely complex if it is to operate satisfactorily under all conditions. The second category of device is widely used but suffers from the disadvantage that its output is proportional to the strength of the horizontal component of the earth's magnetic field. It is also relatively costly to produce.

The invention has as its object to provide a novel direction finding device having a relatively simple structure which is capable of being produced at modest cost and provides an accurate output even under difficult conditions.

According to the invention there is provided a direction-finding device comprising a housing defining a chamber having an inside bottom surface in the form of a segment of a sphere, and a float within the chamber having a bottom surface in the form of a segment of sphere spaced from the inside bottom surface of the chamber, the float incorporating a permanent magnet defining laterally-opposed opposite poles on the float which serve to orient the float with respect to the earth's magnetic field, wherein the float is freely supported within the chamber by means of a liquid, and the liquid is magnetisable so that the magnetic interaction between the magnet poles and the magnetisable liquid acts to laterally centre the float within the chamber.

By a "magnetisable liquid" (sometimes called a "magnetic fluid") is meant a liquid containing magnetisable particles, generally ferromagnetic particles, in suspension therein so as to cause the liquid as a whole to behave as though it were itself magnetisable by an external magnetic field.

It will be appreciated that the orientation of a reference point on the housing with respect to the float in a horizontal plane will indicate the magnetic heading of a platform to which the housing is fixed, and this indication will be substantially unaffected by rolling or pitching movements of the platform. By suitable design of the geometries of the inside surface of the chamber and the outside surface of the float, it is possible to allow for at least 45 degrees freedom of movement of the platform in any direction with respect to the vertical axis. Thus, in marine use, the device may act like a conventional compass having effectively complete freedom of movement about any horizontal axis. Furthermore the device may be produced at low cost.

In a preferred form of the invention, the device incorporates sensing means for sensing the relative orientation of the housing and the float in a horizontal plane and supplying an electrical output signal indicative of that orientation, so as to enable the magnetic heading to be fed to an automatic navigational system for example. The sensing means is conveniently a magnetic sensor responsive to the positions of the poles of the magnet, and is advantageously a differential fluxgate sensor comprising two differential fluxgate pairs having mutually transverse axes of sensitivity, each differential fluxgate pair comprising two coils wound in series opposition. The output of such a differential sensor will be substantially unaffected by movements of the float within the chamber such as to bring one pole of the magnet closer to the sensor and the other pole further away from the sensor, and the scale factor of the output will remain substantially constant.

In order that the invention may be more fully understood, a preferred form of device in accordance with the invention will now be described, by way of example, with reference to the accompanying drawings, in which.

Figure 1:
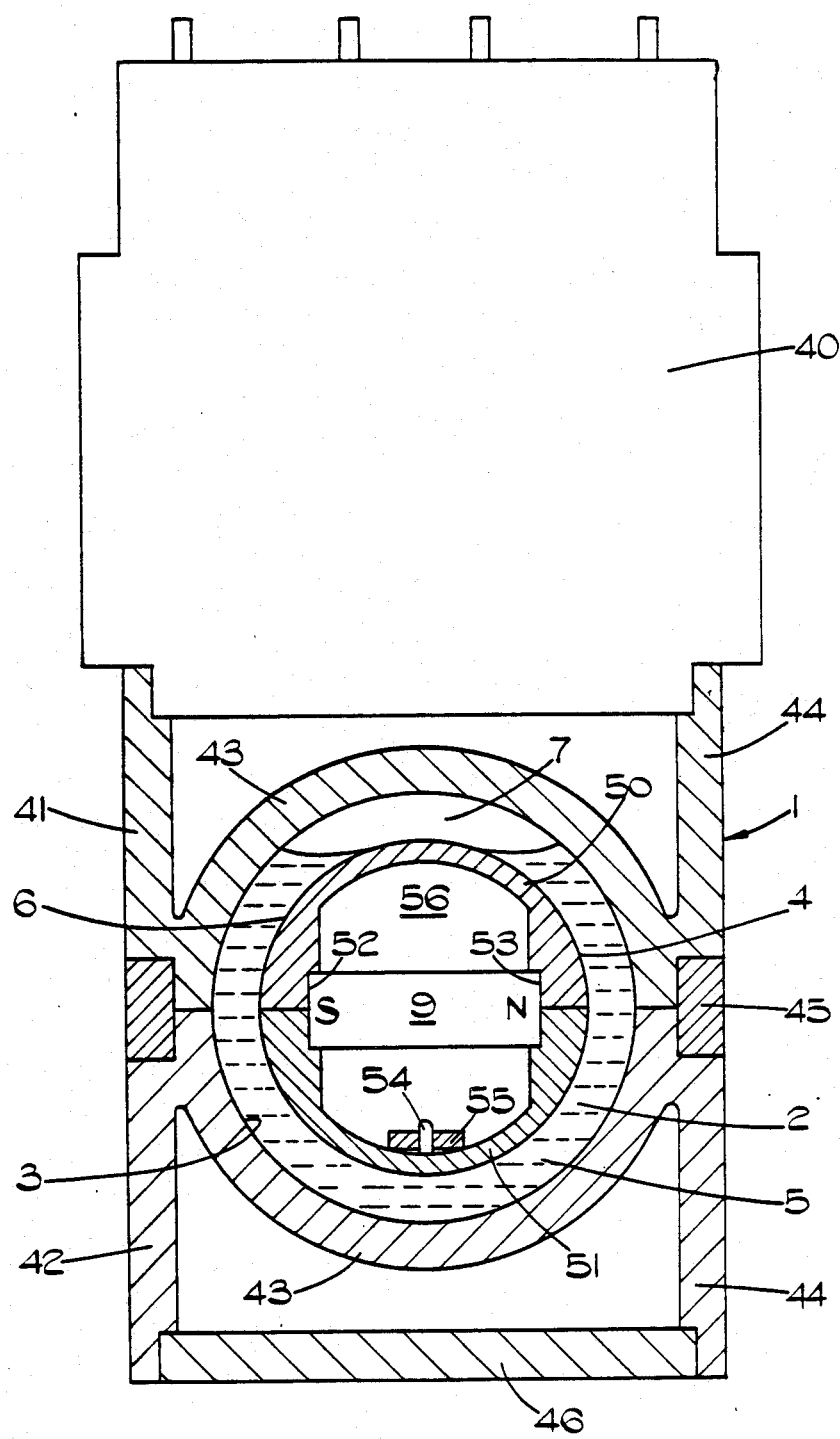
FIG. 1 is a diagrammatic view of the device in vertical section.

Referring to FIG. 1, the illustrated device comprises a housing 1, made of plastics material for example, defining a chamber 2 having a spherical inside surface 3, and a sensing head 40 not shown in detail in FIG. 1). A spherical float 4 is supported by a liquid 5 within the chamber 2 so that the spherical outside surface 6 of the float 4, which is slightly smaller in diameter than the inside surface 3 of the chamber 2, is equidistantly spaced from the top and bottom of the inside surface 3 of the chamber 2. For example, if the inside surface 3 of the chamber 2 has a diameter of 18 mm and the outside surface 6 of the float 4 has a diameter of 14 mm, there will be a constant spacing of approximately 2 mm between the two surfaces 3 and 6. To ensure this constant spacing the quantity of liquid 5 in the chamber 2 is accurately determine so as to leave an air space 7 above the float 4.

The housing 1 comprises two shells 41 and 42, each having a hemispherical portion 43 and a side wall 44, and a milled ring 45 connecting the two shells 41 and 42 together. The shells 41 and 42 are glued together, after introduction of the float 4 and liquid 5 therebetween, to define the spherical chamber 2, and the sensing head 40 is glued to one end of the resulting housing 1, a circular disc 46 being glued in position so as to close off the opposite end of the housing 1.

The float 4 comprises two hemispherical shells 50 and 51, made of plastics material, for example, and each of which is formed with two diametrically opposed notches 52 and 53 in its inside edge to accommodate a cylindrical bar magnet 9. In addition one of the shells 51 is formed with a nipple 54 for receiving an annular weight 55 whose function is to make the float assembly pendulous. The shells 50 and 51 are glued together with the two ends of the bar magnet 9 accommodated within the notches 52 and 53 in the two shells 50 and 51, and a sealed air space 56 is thereby formed within the float The composite density of the float 4 is arranged to be approximately 0.95 of the density of the liquid 5 so that the float 4 is only just buoyant within the liquid 5.

The liquid 5 in the chamber 2 is a magnetisable liquid, that is it contains magnetisable particles, and the magnetic fields which are produced within the magnetisable liquid 5 by the bar magnet 9 in the assembled device serve to magnetise the particles within the liquid 5 in the vicinity of the diametrically opposed poles of the bar magnet 9. Furthermore the resulting magnetic forces between the poles of the bar magnet 9 and the magnetised particles in the liquid 5 cause pressure gradients to be induced in the liquid in the vicinity of the poles. These pressure gradients will tend to resist any movement of the float 4 so as to bring either pole of the bar magnet 9 closer to the inside surface 3 of the chamber 2, and hence the magnetic interaction between the bar magnet 9 and the magnetisable liquid 5 will serve to laterally centre the float 4 within the chamber 2 along the axis of the bar magnet 9. In addition the bar magnet 9 within the float 4 floating freely within the liquid 5 will be oriented along the horizontal direction of the earth's magnetic field in the manner of a conventional compass needle. Furthermore, in view of the spherical shapes of the outside surface 9 of the float 9 and of the inside surface 4 of the chamber 2, tilting of the housing 1 in any direction with respect to its vertical axis will not affect the spacing of the poles of the bar magnet 9 from the inside surface 3 of the chamber 2, and thus will no affect magnetic centring of the float 4 within the chamber 2. Also the fact that the float 4 and liquid 5 have approximately the same density will mean that swirl effects caused by acceleration of the float 4 within the liquid will be minimised.

It will be appreciated from the above description that the float 4 is supported by virtue of its buoyancy so that its vertical position is determined by the depth of the liquid 5, and that it is only the horizontal centring of the float 4 which is controlled by the magnetic interaction between the poles of the bar magnet 9 and the magnetisable particles within the liquid 5. Since the forces which are to be compensated by such magnetic interaction are relatively small, therefore, the liquid 5 may be a low gauss ferrofluid. However, it is also within the scope of the invention for the float additionally to be supported vertically by such magnetic interaction, in which case a substantially higher gauss ferrofluid is required, although such an arrangement is inherently less accurate in operation by virtue of the fact that any slight inhomogeneities on the inside surface 3 of the chamber 2 will tend to cause an imbalance in the magnetic forces associated with the two poles of the bar magnet 9 acting upwardly on the float 4. In the case of the arrangement described with reference to the drawings the effect of such forces is minimised by virtue of the use of low gauss ferrofluid and by virtue of an increased spacing between the poles of the bar magnet 9 and the inside surface 3 of the chamber 2.

Figure 2:
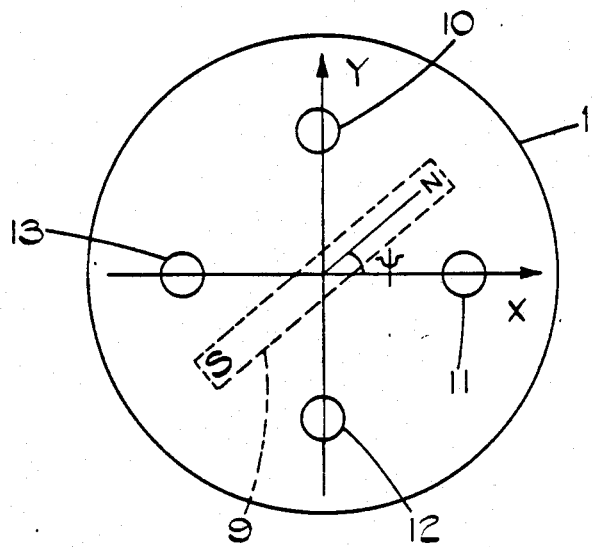
FIG. 2 is a diagrammatic view of the device from above illustrating the positioning of the coils of the differential fluxgate.

Referring to FIG. 2, the sensing head 40 incorporates four sets of coils 10 to 13 having mu-metal cores, the coils 10 to 13 being equiangularly distributed with respect to the central axis of the housing 1 with their cores disposed parallel to one another and with the two sets of core ends being disposed in two parallel planes. FIG. 2 shows the coils 10 to 13 disposed along two axes X and Y intersecting at the central axis, and the projection of the bar magnet 9 (shown in broken lines) on one of the planes containing the core ends. If the angle between the axis of the bar magnet 9 in this projection and the X-axis is defined as $\psi$, then the outputs $X_{o/p}$ and $Y_{o/p}$ of the differential fluxgate will be proportional to $\cos \psi$ and $\sin \psi$ respectively.

Figure 3:
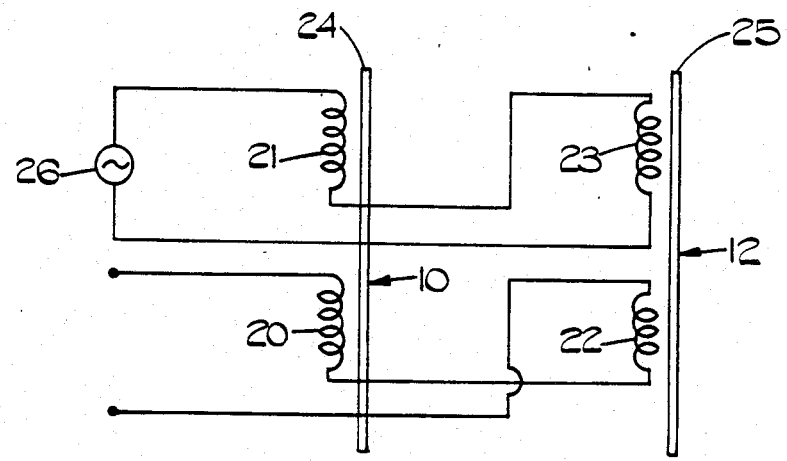
FIG. 3 is a diagram illustrating the winding of the coils of one of the two fluxgate pairs.

The coils 10 and 12 form a differential fluxgate pair having an axis of sensitivity along the Y-axis, and the coils 11 and 13 form a differential fluxgate pair having an axis of sensitivity along the X-axis. FIG. 3 illustrates the winding of the coils in one of these two fluxgate pairs, it being understood that the coils of the other fluxgate pair are wound similarly. Referring to FIG. 3 the differential fluxgate pair comprises two coils 20 and 22 connected in series opposition so that the output from these coils is proportional to the difference between the currents induced in the coils. In addition two excitation coils 21 and 23 are provided with the coil 21 being wound on the same core 24 as the coil 20 and the coil 23 being wound on the same core 25 as the coil 22. The excitation coils 21 and 23 are connected in series so that current flow through the coils is in the same direction.

In operation an alternating excitation current is supplied to the excitation coils 21 and 23 from an a.c. supply 26. This excitation current serves to induce alternating currents the sensing coils 20 and 22 which are in opposite directions and therefore cancel each other out. The level of the excitation current is such as to saturate the cores 24 and 25, and the two cores 24 and 25 will be saturated at the same point in the current cycle in the absence of any external magnetic field. However, when the bar magnet on the float is positioned such that the poles do not lie directly beneath the axis of sensitivity of the fluxgate pair, differing external magnetic fields will be experienced by the cores 24 and 25 due to the bar magnet. The result of this is that one of the cores will saturate before the other during a cycle of the excitation current, and conversely the one core will desaturate before the other, so that there will be a phase difference between the currents induced in the sensing coils 20 and 22, and the output of these sensing coils 20 and 22 will be in the form of an alternating waveform having a frequency which is double the excitation frequency.

Figure 4:
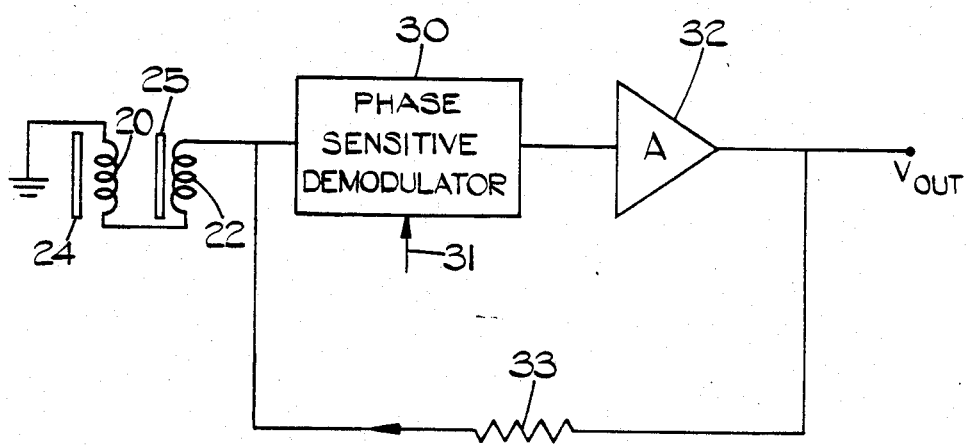
FIG. 4 is a circuit diagram of the signal processing circuitry associated with one of the fluxgate pairs.

The output of the sensing coils 20 and 22 is supplied to a phase sensitive modulator 30 as shown in FIG. 4, and a reference signal having a frequency which is double the excitation frequency is supplied to a reference input 31 of the demodulator 30. The demodulation product is applied to a high-gain amplifier 32 and the resulting output $V_{OUT}$ is proportional to the difference between the external magnetic fields applied to the sensing coils 20 and 22. A nulling current is fed back by way of a resistor 33 to the sensing coils 20 and 22 in order to restore flux balance. Thus the coils 20 and 22 are disposed in a balanced bridge circuit. As discussed above it will be appreciated that the output voltages associated with the two fluxgate pairs will be proportional to $\cos \psi$ and $\sin \psi$ respectively, so that the two outputs will provide a unique indication of the relative orientation of the housing 1 and the float 4.

Although, in the illustrated device, the arrangement for sensing the relative orientation of the housing and the float is in the form of a differential fluxgate it should be understood that other forms of sensor may be used or, where the device is simply to be visually read, the sensor may be dispensed with entirely. More particularly the sensor may be constituted by a conventional fluxgate, although it should be understood that the use of a differential fluxgate is preferable as this will render the sensor insensible to magnetising fields external to the device, such as the earth's magnetic field. Most importantly the sensitivity of such a sensor and the scale factor of its outputs will remain substantially constant irrespective of movements of the float relative to the vertical axis of the housing since any increase in the magnetic field sensed by one coil of a fluxgate pair due to one of the magnet poles moving closer to the sensor will be compensated for by a decrease in the magnetic field sensed by the other, oppositely wound coil of that fluxgate pair due to the other magnet pole moving further away rom the sensor. In the illustrated device, separate excitation and sensing coils are provided in order to avoid having to use a relatively costly transformer, but it should be understood that it is quite feasible for a single set of coils to serve as both the excitation and sensing coils.

The invention also provides, in another aspect, a direction-finding device comprising a housing, a magnetic indicator gimballed or otherwise supported so that its opposite poles are aligned in use along the earth's magnetic field, and sensing means for sensing the relative orientation of the housing and the indicator in a horizontal plane and supplying an electrical output signal indicative of that orientation, wherein the sensing means is a differential fluxgate sensor comprising two differential fluxgate pairs each of which is responsive to the positions of the poles of the magnetic indicator relative to a respective axis of sensitivity in a horizontal plane, each differential fluxgate pair comprising two coils wound in series opposition and the of sensitivity of the two differential fluxgate pairs being mutually transverse.

I claim:

1. A direction-finding device comprising a housing defining a chamber having an inside bottom surface in the form of a segment of a sphere, and a float within the chamber having a bottom surface in the form of a segment of sphere spaced from the inside bottom surface of the chamber, the float incorporating a permanent magnet defining laterally-opposed opposite poles on the float which serve to orient the float with respect to the earth's magnetic field, wherein the float is freely supported within the chamber by means of a liquid, and the liquid is magnetizable so that the magnetic interaction between the same magnet poles that orient the float with respect to the earth's magnetic field, and the magnetizable liquid, acts also to laterally centre the float within the chamber.

2. A device according to claim 1, wherein the float is supported within the chamber predominantly by virtue of its buoyancy within the liquid.

3. A device according to claim 1, wherein the float is supported within the chamber predominantly by magnetic interaction between the magnet poles and the magnetisably liquid.

4. A device according to claim 1, wherein the composite density of the float is slightly less than the density of the liquid.

5. A device according to claim 4, wherein the composite density of the float is approximately 0.95 of the density of the liquid.

6. A device according to claim 1, wherein the outside surface of the float is spherical and the poles of the magent are positioned on a diameter of the float.

7. A device according to claim 6, wherein the float comprises two hemispherical shells joined together along a diametral plane.

8. A device according to claim 1, wherein the float is weighted at its bottom so as to render it pendulous.

9. A device according to claim 1, wherein the magnet is in the form of a bar magnet accommodated within the float.

10. A device according to claim 1, wherein the inside surface of the chamber is spherical.

11. A device according to claim 10, wherein the housing comprises two shells having hemispherical inside surface which are joined together along a diametral plane.

12. A device according to claim 1, incorporating sensing means for sensing the relative orientation of the housing and the float in a horizontal plane and supplying an electrical output signal indicative of that orientation.

13. A device according to claim 12, wherein the sensing means is a magnetic sensor responsive to the positions of the poles of the magnet.

14. A device according to claim 13, wherein the sensing means is a differential fluxgate sensor comprising two differential fluxgate pairs having mutually transverse axes of sensitivity, each differential fluxgate pair comprising two coils wound in series opposition.

* * * * *